US005997586A

United States Patent [19]

Smith et al.

[11] Patent Number: 5,997,586

[45] **Date of Patent: *Dec. 7, 1999**

[54] DRY-CLEANING BAG WITH AN INTERIOR SURFACE CONTAINING A DRY-CLEANING COMPOSITION

[76] Inventors: James A. Smith, 85 Watch Hill Way, Chatham, Mass. 02633; George W. Kellett, 52 Spruce St., Cranford, N.J. 07016

[ * ] Notice: This patent is subject to a terminal disclaimer.

[21] Appl. No.: 09/005,726

[22] Filed: Jan. 13, 1998

Related U.S. Application Data

[63] Continuation of application No. 08/700,119, Aug. 20, 1996, Pat. No. 5,746,776, which is a continuation of application No. 08/463,493, Jun. 5, 1995, abandoned.

[51] Int. Cl.$^6$ .............................. D06L 1/00; D06L 1/02; C11D 17/00; B29C 49/04

[52] U.S. Cl. ............................ 8/142; 510/293; 510/295; 510/297; 510/285; 510/291; 510/277; 206/278; 206/286; 206/287; 383/42; 383/95; 383/96; 383/97; 383/78; 383/81; 383/63; 383/68; 383/116; 442/164; 442/168; 442/170; 442/171; 264/512; 264/515; 264/545; 264/546; 264/500

[58] Field of Search ................................ 8/142; 510/293, 510/295, 297, 285, 291, 277; 383/42, 95, 96, 97, 78, 81, 63, 68, 116; 206/278, 286, 287; 220/200, 359; 442/164, 168, 170, 171; 264/500, 512, 515, 545, 546

[56] References Cited

U.S. PATENT DOCUMENTS

| | | | |
|---|---|---|---|
| Re. 28,969 | 9/1976 | Naito . | |
| 375,652 | 12/1887 | Scott | 8/142 |
| 1,885,133 | 11/1932 | Oppenheimer . | |
| 2,102,858 | 12/1937 | Schlumbohm . | |
| 2,251,328 | 8/1941 | Ehret . | |
| 2,316,386 | 4/1943 | Albrecht | 8/142 |
| 2,560,649 | 7/1951 | Hornaday . | |
| 3,088,158 | 5/1963 | Boyle . | |
| 3,151,345 | 10/1964 | Massop | 8/150 |
| 3,242,109 | 3/1966 | Showalter . | |
| 3,323,206 | 6/1967 | Clark . | |
| 3,377,249 | 4/1968 | Marco . | |
| 3,435,537 | 4/1969 | Rumsey . | |
| 3,442,692 | 5/1969 | Gaiser . | |
| 3,463,735 | 8/1969 | Stonebraker . | |
| 3,579,454 | 5/1971 | Collier . | |
| 3,593,544 | 7/1971 | Henderson . | |
| 3,632,396 | 1/1972 | Perez-Zamora . | |
| 3,637,224 | 1/1972 | Triplett . | |
| 3,650,816 | 3/1972 | Rudy . | |
| 3,686,125 | 8/1972 | Miller . | |
| 3,813,221 | 5/1974 | Stubits | 8/142 |
| 3,816,321 | 6/1974 | Kleinschmidt . | |
| 3,826,682 | 7/1974 | Liebowitz . | |
| 3,827,857 | 8/1974 | Boulus | 8/137 |
| 3,840,497 | 10/1974 | Gondorchin . | |
| 3,888,766 | 6/1975 | De Young . | |
| 3,890,448 | 6/1975 | Ito . | |

(List continued on next page.)

FOREIGN PATENT DOCUMENTS

| | | |
|---|---|---|
| 1017101 | 9/1979 | Canada . |
| 1086846 | 5/1994 | China . |
| 0036833 | 9/1981 | European Pat. Off. . |
| 0213500 | 3/1987 | European Pat. Off. . |
| 0225848 | 6/1987 | European Pat. Off. . |
| 0328174 | 8/1989 | European Pat. Off. . |
| 0344847 | 12/1989 | European Pat. Off. . |
| 0402981 | 12/1990 | European Pat. Off. . |
| 0429172 A1 | 5/1991 | European Pat. Off. . |
| 0498433 | 8/1992 | European Pat. Off. . |
| 0527625 | 2/1993 | European Pat. Off. . |
| 0630965 | 12/1994 | European Pat. Off. . |
| 0738778 A1 | 10/1996 | European Pat. Off. . |
| 2021561 | 11/1970 | Germany . |
| 2460239 | 7/1975 | Germany . |
| 62 20431 | 8/1994 | Japan . |
| 90 86545 | 3/1997 | Japan . |
| 90 86546 | 3/1997 | Japan . |
| 2302553 | 1/1997 | United Kingdom . |
| 2310796 | 9/1997 | United Kingdom . |
| WO 96/09233 | 3/1966 | WIPO . |
| WO 97/20099 | 6/1977 | WIPO . |
| WO 97/27354 | 7/1977 | WIPO . |
| WO 92/17285 | 10/1992 | WIPO . |
| WO 96/30471 | 10/1996 | WIPO . |
| WO 96/30472 | 10/1996 | WIPO . |
| WO 96/30580 | 10/1996 | WIPO . |
| WO 96/30581 | 10/1996 | WIPO . |
| WO 96/30583 | 10/1996 | WIPO . |
| WO 96/37652 | 11/1996 | WIPO . |
| WO 97/00738 | 1/1997 | WIPO . |
| WO 97/00939 | 1/1997 | WIPO . |
| WO 97/00990 | 1/1997 | WIPO . |
| WO 97/00991 | 1/1997 | WIPO . |
| WO 97/00992 | 1/1997 | WIPO . |
| WO 97/00993 | 1/1997 | WIPO . |
| WO 97/20098 | 6/1997 | WIPO . |
| WO97/22683 | 6/1997 | WIPO . |
| WO 97/26821 | 7/1997 | WIPO . |
| WO 97/34519 | 9/1997 | WIPO . |
| WO 97/41292 | 11/1997 | WIPO . |

OTHER PUBLICATIONS

Takase et al., "High Temperature Characteristics of Nylon–11 and Nylon–7 Piezoelectrics", *Macromolecules,* pp. 1–46 (May 1991) (Office of Naval Research, Technical Report No. 23).

Yoshihiro Ohmiya et al., "Mechanical Properties of an Aromatic Polyamide–imide Composite film reinforced with an Aeromatic Polyamide Fiber Cloth at High Temperature", Journal of Applied Polymer Science, vol. 33, pp. 1601–1607 (1987), (month unknown).

European Search Report for Application Number EP 93911304; completed by Examiner H. Pfannenstein, dated Feb. 6, 1995; 5 pages.

*Primary Examiner*—Alan Diamond

[57] ABSTRACT

A bag for the cleaning and containment of soiled fabric articles is provided which comprises a fastening system that, when fastened provides a vapor impermeable container and an interior surface releasably impregnated with an effective amount of a gelled liquid dry-cleaning composition.

81 Claims, No Drawings

U.S. PATENT DOCUMENTS

| | | | |
|---|---|---|---|
| 3,896,033 | 7/1975 | Grimm . | |
| 3,933,425 | 1/1976 | Grunewalder et al. | 8/142 |
| 3,936,538 | 2/1976 | Marshall et al. . | |
| 3,945,936 | 3/1976 | Lucas et al. . | |
| 3,949,137 | 4/1976 | Akrongold et al. . | |
| 3,977,980 | 8/1976 | Fry . | |
| 3,988,499 | 10/1976 | Reynolds . | |
| 3,989,638 | 11/1976 | Bradley et al. . | |
| 3,995,084 | 11/1976 | Berger . | |
| 4,011,172 | 3/1977 | Marsan et al. . | |
| 4,017,411 | 4/1977 | Diehl et al. . | |
| 4,019,023 | 4/1977 | Marzonie . | |
| 4,022,938 | 5/1977 | Zaki . | |
| 4,041,205 | 8/1977 | Compa . | |
| 4,049,858 | 9/1977 | Murphy . | |
| 4,065,422 | 12/1977 | Lundmark . | |
| 4,066,394 | 1/1978 | Leonard . | |
| 4,077,890 | 3/1978 | Barker . | |
| 4,101,711 | 7/1978 | Stillman . | |
| 4,106,214 | 8/1978 | Schmidt . | |
| 4,110,498 | 8/1978 | Benjamin . | |
| 4,118,525 | 10/1978 | Jones . | |
| 4,126,563 | 11/1978 | Barker . | |
| 4,127,515 | 11/1978 | MacRae . | |
| 4,137,200 | 1/1979 | Wood . | |
| 4,142,978 | 3/1979 | Murphy . | |
| 4,170,565 | 10/1979 | Flesher et al. . | |
| 4,188,304 | 2/1980 | Clarke et al. . | |
| 4,214,038 | 7/1980 | McCarty . | |
| 4,231,166 | 11/1980 | McMillan . | |
| 4,236,322 | 12/1980 | Hastings . | |
| 4,239,639 | 12/1980 | Gilbert et al. . | |
| 4,242,377 | 12/1980 | Roberts et al. . | |
| 4,271,272 | 6/1981 | Stickman . | |
| 4,289,815 | 9/1981 | Lee . | |
| 4,336,024 | 6/1982 | Denissenko et al. | 8/142 |
| 4,344,930 | 8/1982 | MacRae . | |
| 4,351,754 | 9/1982 | Dupre . | |
| 4,362,638 | 12/1982 | Caskey et al. . | |
| 4,374,035 | 2/1983 | Bossu . | |
| 4,388,332 | 6/1983 | Egee . | |
| 4,412,027 | 10/1983 | Klein . | |
| 4,448,699 | 5/1984 | Barrat . | |
| 4,488,552 | 12/1984 | McCann . | |
| 4,511,495 | 4/1985 | Melville . | |
| 4,514,444 | 4/1985 | Ives . | |
| 4,530,781 | 7/1985 | Gipp . | |
| 4,532,063 | 7/1985 | Gueldenzopf . | |
| 4,534,892 | 8/1985 | Suzuki . | |
| 4,540,510 | 9/1985 | Karl . | |
| 4,548,954 | 10/1985 | Smith . | |
| 4,557,852 | 12/1985 | Schulz . | |
| 4,563,483 | 1/1986 | Smith . | |
| 4,565,644 | 1/1986 | Smith . | |
| 4,566,980 | 1/1986 | Smith . | |
| 4,569,861 | 2/1986 | Smith . | |
| 4,581,287 | 4/1986 | Smith . | |
| 4,581,385 | 4/1986 | Smith . | |
| 4,594,362 | 6/1986 | Smith . | |
| 4,610,904 | 9/1986 | Mahn . | |
| 4,613,446 | 9/1986 | Magyar . | |
| 4,704,222 | 11/1987 | Smith . | |
| 4,740,326 | 4/1988 | Hortel et al. . | |
| 4,749,509 | 6/1988 | Kacher . | |
| 4,749,596 | 6/1988 | Evans . | |
| 4,764,289 | 8/1988 | Trinh . | |
| 4,797,221 | 1/1989 | Gueldenzopf . | |
| 4,806,572 | 2/1989 | Kellett . | |
| 4,816,095 | 3/1989 | Taylor . | |
| 4,820,435 | 4/1989 | Zafiroglu . | |
| 4,824,582 | 4/1989 | Nayar . | |
| 4,834,900 | 5/1989 | Soldanski et al. . | |
| 4,839,076 | 6/1989 | Willman et al. . | |
| 4,840,792 | 6/1989 | Joulain . | |
| 4,853,142 | 8/1989 | Win . | |
| 4,855,183 | 8/1989 | Oberle . | |
| 4,856,541 | 8/1989 | Kellett . | |
| 4,889,643 | 12/1989 | Royce . | |
| 4,894,264 | 1/1990 | Akao . | |
| 4,909,962 | 3/1990 | Clark . | |
| 4,917,925 | 4/1990 | Loretti . | |
| 4,938,879 | 7/1990 | Kellett . | |
| 4,946,617 | 8/1990 | Sheridan et al. . | |
| 4,953,739 | 9/1990 | Wooge . | |
| 5,002,075 | 3/1991 | Kellett . | |
| 5,053,157 | 10/1991 | Lloyd . | |
| 5,055,215 | 10/1991 | Mains et al. . | |
| 5,062,473 | 11/1991 | Kellett . | |
| 5,062,973 | 11/1991 | Kellett . | |
| 5,066,413 | 11/1991 | Kellett . | |
| 5,077,119 | 12/1991 | Wraige . | |
| 5,082,466 | 1/1992 | Rubenstein . | |
| 5,108,660 | 4/1992 | Michael . | |
| 5,145,595 | 9/1992 | Morris et al. . | |
| 5,173,200 | 12/1992 | Kellett . | |
| 5,196,132 | 3/1993 | Mains . | |
| 5,208,074 | 5/1993 | Kosal . | |
| 5,215,795 | 6/1993 | Matsumoto . | |
| 5,238,587 | 8/1993 | Smith et al. . | |
| 5,261,426 | 11/1993 | Kellett . | |
| 5,296,291 | 3/1994 | Mueller . | |
| 5,415,904 | 5/1995 | Takubo . | |
| 5,444,924 | 8/1995 | Joslin . | |
| 5,449,763 | 9/1995 | Wueff . | |
| 5,454,982 | 10/1995 | Murch . | |
| 5,454,983 | 10/1995 | Michael . | |
| 5,460,864 | 10/1995 | Heitkamp . | |
| 5,488,157 | 1/1996 | Bjorkquist . | |
| 5,547,476 | 8/1996 | Siklosi . | |
| 5,591,236 | 1/1997 | Roetker . | |
| 5,603,284 | 2/1997 | Freedman . | |
| 5,612,105 | 3/1997 | Okamoto . | |
| 5,630,847 | 5/1997 | Roetker . | |
| 5,630,848 | 5/1997 | Young . | |
| 5,632,780 | 5/1997 | Siklosi . | |
| 5,648,326 | 7/1997 | Sramek . | |
| 5,658,625 | 8/1997 | Bradfute . | |
| 5,658,651 | 8/1997 | Smith . | |
| 5,681,355 | 10/1997 | Davis . | |
| 5,687,591 | 11/1997 | Siklosi . | |
| 5,746,776 | 5/1998 | Smith et al. | 8/142 |

DRY-CLEANING BAG WITH AN INTERIOR SURFACE CONTAINING A DRY-CLEANING COMPOSITION

This is a continuation of application Ser. No. 08/700,119, filed Aug. 20, 1996, now U.S. Pat. No. 5,745,776 which is a continuation of application Ser. No. 08/463,493, filed Jun. 5, 1995 now abandoned.

FIELD OF THE INVENTION

The present invention relates to a laundry-cleaning device comprising a dry-cleaning bag having an opening with a fastening system that enables closure of the bag in a vapor impermeable manner and at least a portion of the interior surface of the bag having releasably absorbed therein an effective amount of dry-cleaning composition, as well as a method for use of the bag. The invention particularly relates to a method for use of the dry-cleaning bag to freshen and/or dry-clean soiled fabrics such as articles of clothing. More particularly, the present invention relates to a method of dry cleaning that can be carried out in the home in a rotary clothes dryer.

BACKGROUND OF THE INVENTION

Methods for dry-cleaning fabrics commonly employ organic solvents which can readily dissolve or disperse soils such as water-insoluble substances, including greases, oily dirts and the like, and which exhibit low solvent boiling points, enabling easy recovery of the solvents.

The use of solvent-based dry-cleaning methods has, however, been primarily limited to commercial cleaning operations which employ expensive specialized equipment. Such equipment includes stills with condensers to contain vapors from the cleaning solvents, which are often toxic. As a result, to utilize such dry-cleaning processes, particularly to remove water-insoluble spots and/or stains from clothes, the user must bring the clothes to a specialized dry-cleaning establishment and pick up the cleaned clothes at a later date. This results in inconvenient expenditures of time in going to the dry-cleaner, waiting for the clothes to be properly cleaned, picking up the clothes, and dealing with damaged and lost articles of clothing. Moreover, articles of clothing from many different people are dry-cleaned with the same batch of solvent, which can result in malodorous residues.

A process for home dry-cleaning clothing is disclosed by S. Denissenko et al. in U.S. Pat. No. 4,336,024, wherein the soiled areas are pre-treated with a liquid cleaning composition. The clothing is then attached to an absorbent sheet and spun using the spin cycle of a washing machine, so that the cleaning composition and the soil are driven through the clothing and into the absorbent sheet. It is also disclosed that the absorbent sheet can be integrally sealed onto a plastic sheet, so that the clothing can be enclosed by the sheet while it is spun in a washing machine. Also, U.S. Pat. No. 5,238,587 issued to J. Smith et al., discloses a method for cleaning soiled fabric via the enclosure of the desired clothing in a bag with an added sheet impregnated with a gelled liquid cleaning composition.

It is therefore an object of the invention to provide a solvent-based dry-cleaning composition and a method of use therefor which can be conducted at home without having to take soiled or stale-smelling clothes to commercial cleaning establishments and incurring such inconveniences and disadvantages mentioned above. Additional objects of the present invention will become readily apparent to persons skilled in the art from the following discussion.

SUMMARY OF THE INVENTION

The present invention provides a dry-cleaning device comprising a bag sized for containment and cleaning of a soiled fabric article which comprises an opening having a reversible fastening system. At least a portion of the interior surface of the bag is absorptive, and has a dry-cleaning composition releasably absorbed thereinto. In the practice of the present method, the soiled fabric (or fabrics) are added to the bag and the bag subjected to an amount of agitation and heat effective to release the dry-cleaning composition in liquid and/or in vaporous form from the interior absorptive surface of the bag. The composition contacts spotted and/or stained portions of fabric therein and removes the spots and/or stains. In a preferred aspect of the invention, the bag of the present invention may be placed in a rotary hot air clothes dryer to provide the effective amount of heat and agitation, or tumbling. Thus, the present invention provides a method for cleaning soiled fabric articles comprising (a) placing a soiled, i.e., spotted and/or stained fabric article in the afore-said dry-cleaning bag; (b) sealing the bag; and (c) tumbling the sealed bag and its contents in a dryer at a temperature effective to release the dry-cleaning composition in liquid and/or vapor form and for a time effective to contact an effective amount of said released dry-cleaning composition with said soiled fabric, so as to clean said fabric.

The interior surface of the bag that retains the cleaning composition may be rendered suitably absorptive by a number of means. For example, the bag may have one or more multiple layers of plastic film, the innermost film being absorptive, i.e., a reticulated plastic foam, a solid granular or porous absorbent solid filled plastic film or a combination of both foamed and solids loaded plastic. Such bags may be formed by co-extruding one or more multiple layers of plastic layers simultaneously during the blowing of the bag. In another embodiment of the invention, a single-use dry cleaning bag is provided in which the interior surface of the bag may be pre-impregnated with the dry cleaning composition. For example, in this embodiment of the invention, the interior absorptive surface may be a non-woven fabric attached to the inside surface of the bag after formation of the bag itself, as a second step. The dry-cleaning composition may be applied to the interior absorptive surface of the bag wall, ie., by spraying, after the manufacture of the bag. Once the dry cleaning composition has been applied, the soiled fabric can be introduced into the bag, the bag fastened and tumbled in a clothes dryer.

In an alternative embodiment of the present method, the dry cleaning composition may further be applied directly to the soiled fabric to be cleaned, e.g., by spraying or dipping, the fabric subsequently placed into the bag, the bag sealed and rotated in a hot air clothes dryer. Additionally, the spotted and/or stained sections of the fabric may be manually rubbed on the inside of the impregnated bag to pre-treat the soiled areas with the dry-cleaning compositions in order to loosen the soil. In these embodiments of the invention, the dry cleaning composition cleans the soil from the fabric while excess moisture and the removed soil are absorbed by the interior absorptive surface of the bag.

Preferably, the dry cleaning composition of the present invention is a gel which comprises (a) an effective amount of a gelling agent; (b) a liquid vehicle selected from the group consisting of water, a water-miscible organic solvent and mixtures thereof; and (c) at least one surfactant. The dry-cleaning composition can also contain a minor amount of a non-toxic inorganic salt which is effective to inhibit the transfer of the gelling agent to the soiled fabric, i.e., which inhibits deposition of a visible residue on the fabric article to be cleaned.

The term "fabrics" or "fabric articles" encompasses not only clothing, but other items which are commonly dry-cleaned, including sheets, draperies, rugs, upholstery coverings, towels and the like. As used herein, the term "dryer" refers to a rotary hot air dryer, which tumbles the clothes in a drum with warm or heated air at an elevated temperature, usually at a temperature of about 40–95° C., preferably at about 50–90° C., e.g., preselected periods of time. For example, about 15–45 min of tumbling are sufficient to release the dry-cleaning composition from the interior surface of the bag at these temperatures.

As used herein with respect to the fabrics to be dry-cleaned, the term "soil" includes odoriferous compounds such as tobacco smoke, residue, perfume, mustiness, perspiration and the like, as well as visible spots and stains. Therefore, as used herein, the term "dry cleaning" or "cleaning" includes the removal of both kinds of "soil".

The present invention, including the above-described embodiments and preferred versions thereof is more fully described in the following detailed discussion, wherein all percentages are by weight of the cleaning composition, unless otherwise noted.

DETAILED DISCUSSION OF THE INVENTION

The present dry-cleaning bags may be formed from any flexible material which exhibits sufficient thermal stability for use in the rotary hot air dryer discussed above. Preferably, the bag will be formed from one or more layers of plastic film, the outermost layer providing strength and thermal stability and the interior layer capable of absorbing releasably therein a sufficient amount of the gelled liquid dry-cleaning composition to effectively clean fabrics without significant leaking or bleeding of the composition into the interior of the bag upon storage. In order to effectively contain the vaporous dry-cleaning compositions to within the interior space of the sealed bag, the bag must, of course, have an essentially gas impermeable material as its outermost layer and comprise an opening which can be reversibly closed. For example, the outermost layer of the bag can be formed from polyethylene, polypropylene, polyamide or a multiple or layered complex comprising such materials. Preferably, the innermost plastic layer will be a reticulated plastic film formed in situ, a solid granular or porous absorbent solid filled plastic film or a combination of both foamed and solids loaded plastic. Examples of such materials include, but are not limited to, polyethylene, diatomacious earth filled polyethylene, polypropylene, and other solid absorbents dispersed in film.

In a preferred embodiment, the bag of the present invention is formed by the co-extrusion of materials with the desired properties. However, in an alternative embodiment, the bag of the present invention may be formed in two steps. In this embodiment, the thermally stable outer layer of the bag is pre-formed and a non-woven fabric subsequently attached to the inside surface of the bag in a second step.

Non-woven cloth materials useful in the present invention to form the absorbent interior surface of the bag are generally adhesively bonded fibrous products having a web or corded fiber structure, or those which comprise fibrous mats in which the fibers are distributed haphazardly or in a random array. The fibers can be natural, such as wool, silk, jute, hemp, cotton, linen, sisal, or rarnie; or synthetic such as rayon, cellulose ester, polyvinyl derivatives, polyolefms, polyamides or polyesters. Generally, any diameter or denier of fiber is useful in the present invention. The non-woven cloth materials employed herein are not prone to tear or separate when used, for example, in an automatic dryer, due to the haphazard or random array of fibers in the non-woven material which impart excellent strength in all directions. Some examples of preferred non-woven cloth material useful as substrates in the present invention include 100% rayon sheets, known as Fabray® Nonwoven Fabric F-110 (40 gm), available from Stems Technical Textile Co., or as Brand #6129 from Scott Nonwovens; or 100% polypropylene sheets, known as NW-161, available from Kimberly Clark Co., Neenah, Wis.

Preferably the bags suitable for use in the present invention will have dimensions ranging from about 18"×23" up to about 36"×40". However, the bag must also be of a sufficient size to carry an effective amount of dry-cleaning composition on its interior surface. For these reasons, the most preferred size of bag for use in the present invention range is from about 20"×28" to about 26"×30". These dimensions preferably result in the dry-cleaning composition being releasably absorbed onto an inner surface of the bag having a surface area ranging of about 1020 $in^2$, and most preferably from about 560 $in^2$ to about 780 $in^2$.

A gelled liquid dry-cleaning composition useful in the invention can be prepared by simply mixing in the desired proportions a gelling agent, water, a dry-cleaning organic solvent, a surfactant and, optionally, an alkali metal salt, stirring the mixture until a gellable homogeneous composition forms. Preferably, the gelling agent is added to the water in a suitable vessel with agitation and the application of external heating. At about 75–85° C., the solvent, surfactants and any other adjuvants, such as fragrance and preservative, are added sequentially with continuous agitation.

The dry-cleaning composition can then be applied onto the inner absorptive surface of the bag, as by spraying, sponging or other known methods of application and then allowed to gel. Alternatively, the dry-cleaning composition may be impregnated into the inner surface of the bag during manufacturing. This embodiment of the invention provides a single use dry cleaning bag. If impregnated, the impregnation step would be achieved, for example, by spraying the dry cleaning composition onto the absorptive inner surface of the bag during the 'cool-down' step of manufacturing, i.e., that step when air is pumped into the bag to cool it after extrusion. The dry-cleaning composition may further be applied directly to the soiled fabric to be cleaned, i.e., by spraying, sponging or dipping, prior to introducing the fabric into the bag.

Following a cooling period, the finished dry-cleaning bags are preferably packaged in moisture impermeable packaging, e.g., in foil, a foil-plastic film or a foil-treated paper composite envelope.

Organic Gelling Agent

The present gelled dry-cleaning compositions will include an amount of an organic gelling agent which is effective to gel the liquid dispersions when they are cooled and applied to either the soiled fabric or absorptive bag surface. Any organic gelling agent or mixture of organic gelling agents can be used which stabilizes the dry-cleaning composition and assists in releasably adhering it to the interior surface of the bag. The gelling agent also assists the uniform distribution of the solvent and surfactants in the interior surface while leaving no significant residue on the fabric. Useful gelling agents can include modified starches, modified celluloses (CMC, HPMC), fatty acid and acid salts, fatty alcohols, and polysaccharide gums, i.e., polysaccharide gums that can be gelled in situ by the addition of an effective amount of one or more metal or ammonium cations.

Preferred polysaccharide gums for use in the present compositions include vegetable gums, such as the alkali metal salts of alginic acid ("alginates"), carrageenan (preferably kappa-carrageenan), pectin, guar gum, and mixtures thereof. These "strong gums" re-gel from solution or dispersion to yield a continuous gel structure.

Other useful organic gelling agents include polyvinylpyrrolidone, polyvinyl alcohol, polyacrylamides and polymeric organic waxes. The useful polymeric waxes include ethylene acrylate copolymers, ethylene acrylic acid copolymers and polyethylene (e.g., oxidized polyethylenes). These materials are commercially available in the form of aqueous emulsions or dispersions, e.g., from Allied Chemical, Morristown, N.J., as the A-C Copolymer and A-C Polyethylene series, such as A-C Copolymer 540, A-C Copolymer 580 and A-C Polyethylene 617 and 629. Waxy polyethylene glycols (PEG) such as those of a molecular weight of about 800 to 1700–2000 are preferred.

Preferred organic gelling agents include the alkali earth metal, alkaline earth metal or ammonium salts of various naturally occurring or synthetic fatty acids. Useful fatty acids may be selected from one or more ($C_8$–$C_{22}$) fatty acids which incorporate 0–3 double bonds per fatty acid molecule, e.g., myristic acid, stearic acid, palmitic acid, lauric acid, behenic acid and the like. Alkali metal salts of fatty acids such as stearic acid are preferred.

Preferably, about 0.25–8% of the gelling agent or agents will be employed in the present dry-cleaning compositions.

Organic Solvent

The present dry-cleaning compositions are formed by dispersing the gelling agent in a solvent system which can comprise an organic co-solvent or solvent system. Preferably, the organic solvent or solvent mixture is non-toxic and water-miscible.

Most preferably, the major portion of the organic solvent will be a glycol ether. These materials are lower(alkoxy)- or lower(alkoxy)lower(alkoxy)-ethers of ethanol or isopropanol. Some examples of preferred glycol ethers are available under the trade names Arcosolv® (Arco Chemical Co.) or Cellosolve®, Carbitol®, or Propasol® (Union Carbide Corp.), and include, e.g., butylCarbitol®, hexylCarbitol®, methylCarbitol®, and Carbitol® itself, (2-(2-ethoxy) ethoxy)ethanol. The choice of glycol ether can be readily made by one of skill in the art on the basis of its volatility, water-solubility, wt-% of the total dispersion and the like. Pyrrolidinone solvents such as N-methyl-2-pyrrolidinone (M-Pyrol®) or 2-pyrrolidone (2-Pyrol®) can also be used.

Alcohols which can be employed as co-solvents include liquid polyethylene glycols, i.e., polyethylene glycol-200, 300, 400 or 600, wherein the suffixed numbers indicate the approximate molecular weight of the glycol. Other useful co-solvents include other alcohols, for example: (a) lower (alkanols), such as ethanol, isopropanol, and n-butanol; (b) ketones such as acetone and methyl ethyl ketone; (c) $C_2$–$C_4$ polyols, such as a diol or triol, e.g., ethylene glycol, propylene glyol, glycerol or mixtures thereof or (d) hydrocarbon solvents such as isoparaffmic solvents (Isopar K).

Other organic solvents can also be used, including conventional chlorinated dry-cleaning solvents. Preferred examples of these solvents comprise the di- to tetrachlorinated derivatives of methane, the di- to pentachlorinated derivatives of ethane and of ethylene, the mono- to trichlorinated derivatives of cyclohexane, and monochlorobenzene. Specific examples of this type include carbon tetrachloride, methylene chloride, 1,1-dichloroethane, 1,2-dichloroethane, 1,1-trichloroethane, 1,1,2-trichloroethane, 1,1,1-trichloroethane, 1,1,2-trichloroethane, trichloroethylene, 1,1,2,2-tetrachloroethane, tetrachloroethylene, pentachloroethane, monochlorocyclohexane, 1,4-dichlorocyclohexane, monochlorobenzene and mixtures of the foregoing.

The solvent is present in the dry-cleaning composition in an amount from about 2 to about 32 weight percent, more preferably in an amount of from about 5 to about 25 weight percent and more preferably from about 7.5 to about 15 weight percent.

Surfactant

Also employed in the dry-cleaning composition of the invention are minor but effective amounts of one or more surfactants, which act as cleaning intensifiers to facilitate removal of the soil upon release of the dry-cleaning composition in the dryer. Surfactants are useful in the dry-cleaning composition in amounts from about 1–10 weight percent, and more preferably from about 3–7 weight percent.

Nonionic surfactants and amphoteric surfactants are preferred for use in the dry-cleaning composition and can also act as adjunct fabric softeners. Minor but effective amounts of certain anionic surfactants may also be useful to provide faster dissipation of the composition in the dryer.

Nonionic surfactants include the condensation products of ethylene oxide with a hydrophobic polyoxyalkylene base formed by the condensation of propylene oxide with propylene glycol. The hydrophobic portion of these compounds has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include certain of the commercially-available Pluronic® surfactants (BASF Wyandotte Corp.), especially those in which the polyoxypropylene ether has a molecular weight of about 1500–3000 and the polyoxyethylene content is about 35–55% of the molecule by weight, i.e., Pluronic® L-62.

Preferred nonionic surfactants include the condensation products of $C_8$–$C_{22}$ alkyl alcohols with 2–50 moles of ethylene oxide per mole of alcohol. Examples of compounds of this type include the condensation products of $C_{11}$–$C_{15}$ fatty alcohols with 3–50 moles of ethylene oxide per mole of alcohol which are commercially available from Shell Chemical Co., Houston, Tex., as, i.e., Neodol® 23–6.5 ($C_{12}$–$C_{13}$ fatty alcohol condensed with about 7 moles of ethylene oxide), the PolyTergent® SLF series from Olin Chemicals or the Tergitol® series from Union Carbide, i.e., Tergitol® 15-S-15, which is formed by condensing about 15 moles of ethylene oxide with a $C_{11}$–$C_{15}$ secondary alkanol; Tergitol® TMN-6, which is the condensation product of about 6 moles of ethylene oxide with isolauryl alcohol (CTFA name: isolaureth-6); Incropol® CS-12, which is a mixture of stearyl and cetyl alcohol condensed with about 12 moles of ethylene oxide (Croda, Inc.); Incropol® L-7, which is lauryl alcohol condensed with about 7 moles of ethylene oxide (Croda, Inc.); and Tergitol® 15-S-3, which is the condensation product of about 3 moles of ethylene oxide with a mixture of ($C_{11}$–$C_{15}$) secondary alcohols.

Preferred nonionic surfactants also include ($C_8$–$C_{24}$) fatty acid amides, e.g., the monoamides of a mixture of arachidic and behenic acid (Kenamide® B, Humko Chem. Co., Memphis, Tenn.), and the mono- or di-alkanolamides of ($C_8$–$C_{22}$) fatty acids, e.g., the diethanol amide, monoethanol amide or monoisopropanolamide of coconut, lauric, myristic or stearic acid, or mixtures thereof. For example, Monamide® S is the monoethanol amide of stearic acid (Mona Industries, Inc., Patterson, N.J.), and Monamine ALX-100S (Mona Industries), is a mixture of the diethanol amide of cocoa fatty acid and the diethanol amide of dodecylbenzene sulfonic acid. The fatty alkanolamide designated "Active #2" (Blew Chem. Co.) is also believed to be of this class of nonionic surfactant.

Other nonionic surfactants which may be employed include the ethylene oxide esters of $C_6$–$C_{12}$ alkyl phenols such as (nonylphenoxy)polyoxyethylene ether. Particularly useful are the esters prepared by condensing about 8–12 moles of ethylene oxide with nonylphenol, i.e., the Igepal® CO series (Rhone-Poulenc, Cranbury, N.J.).

Other useful nonionics include the ethylene oxide esters of alkyl mercaptans such as dodecyl mercaptan polyoxyethylene thioether, the ethylene oxide esters of fatty acids such as the lauric ester of polyethylene glycol and the lauric ester of methoxypolyethylene glycol, the ethylene oxide ethers of fatty acid amides, the condensation products of ethylene oxide with partial fatty acid esters of sorbitol such as the lauric ester of sorbitan polyethylene glycol ether, and other similar materials, wherein the mole ratio of ethylene oxide to the acid, phenol, amide or alcohol is about 5–50:1.

Useful amphoteric surfactants include the ($C_8$–$C_{22}$) alkyl (dimethyl)amine oxides, such as those of the Schercamox® series (Scher Chem. Co., Clifton, N.J.), e.g., Schercamox DML is lauryl(dimethyl)amine oxide. Other useful amphoteric surfactants are known to the art, e.g., as disclosed in Marshall et al. (U.S. Pat. No. 3,936,538), the disclosure of which is incorporated by reference herein.

Anionic surfactants suitable for use in the dry-cleaning composition are well known to those of skill in the art, and include, for example, sodium cocoyl isethionate, commercially available as Jordapon® CI from Mazer Chemicals, Gurnee, Ill. The anonionic surfactant may be optionally added in minor but effective amounts, e.g., up to about 1%, in addition to the nonionic or amphoteric surfactant.

One broad class of cationic surfactants suitable for use in the dry-cleaning compositions is referred to as quaternary amines, or "quats." These materials not only function to facilitate soil removal, but can also function to condition the fabrics and to reduce static cling and lint adherence. Subclasses of these materials are well known to those of skill in the art and include the monomethyl trialkyl quaternaries, imidazolinium quaternaries, dimethyl alkyl benzyl quaternaries, dialkyl dimethyl quaternaries, methyl dialkoxy alkyl quaternaries, diamido amine-based quaternaries and dialkyl methyl benzyl quaternaries preferably the "alkyl" moiety of these compounds is a ($C_8$–$C_{24}$)alkyl group and the quaternary(amine) is a chloride or methosulfate salt.

It is sometimes preferable, for convenience, to define the subclasses of aliphatic quarternary amines suitable for use in the dry-cleaning compositions structurally. For example, one useful subclass of aliphatic quaternary amines may be structurally defined as follows:

$$(R)(R_1)(R_2)(R_3)N+X—$$

wherein R is benzyl, or lower(alkyl) benzyl; $R_1$ is alkyl of 10 to 24, preferably 12 to 22 carbon atoms; $R_2$ is $C_{10}$–$C_{24}$-alkyl, $C_1$–$C_4$-alkyl, or ($C_2$–$C_3$)hydroxyalkyl, $R_3$ is $C_1$–$C_4$-alkyl or ($C_2$–$C_3$)hydroxyalkyl and X represents an anion capable of imparting water solubility or dispersibility including chloride, bromide, iodide, sulfate and methosulfate. Particularly preferred species of these aliphatic quats include n-$C_2$–$C_{18}$-alkyl-dimethylbenzylammonium chloride (myrisalkonium chloride), n-$C_{12}$–$C_{14}$-alkyldimethyl (ethylbenzyl) ammonium chloride (quaternium 14), dimethyl-(benzyl)ammonium chloride and mixtures thereof. These compounds are commercially available as the BTC series from Lonza, Fairlawn, N.J., e.g., BTC 2125M is a mixture of myrisalkonium chloride and quaternium-14, or as Variquat® B-343 from Sherex Chem. Co., Dublin, Ohio which is a Dihydrogenated tallow methyl benzyl ammonium chloride. This class of quat is germicidal, and is preferably used in combination with at least one of the other quats disclosed hereinbelow.

Other useful aliphatic quats include those wherein both R and $R_1$ are ($C_8$–$C_{24}$)alkyl, e.g., the N,N-di-(higher)-$C_{10}$–$C_{24}$-alkyl-N,N-di(lower)-$C_1$–$C_4$(alkyl)-quaternary ammonium salts such as distearyl(dimethyl)ammonium chloride, di-hydrogenated tallow(dimethyl)ammonium chloride, ditallow(dimethyl)ammonium chloride (Arquad® 2HT-75, Akzo Chemie, McCook, Ill.), distearyl(dimethyl) ammonium methylsulfate and di-hydrogenated-tallow (dimethyl)ammonium methyl sulfate (Varisoftg 137, Sherex).

Other useful quaternary ammonium antistatic agents include the acid salts of (higher(alkyl)-amido(lower)alkyl)-(dialkyl)-arnines of the general formula:

$$[(A(C{=}O)—Y—)—N(R_1)(R_2)(R_3)]+X—$$

wherein A is a $C_{14}$–$C_{24}$ normal or branched alkyl group, Y is ethylene, propylene or butylene, $R_1$ and $R_2$ are individually H, $C_1$–$C_4$(lower)alkyl or ($C_1$–$C_3$)hydroxyalkyl or together form the moiety —$CH_2$—$CH_2YCH_2$—$CH_2$—, wherein Y is NH, O or $CH_2$; $R_3$ is the same as $R_1$ or is also [A(C═O)Y—], and X is the salt of an organic acid. Compounds of this class are commercially available from Croda, Inc., New York, N.Y., as the Incromate® series, e.g. Incromate® IDL [isostearamidopropyl(dimethyl)amine lactate], Incromate® ISML [isostearamidopropy(morpholinium) lactate] and Incromate® CDP [cocamidopropyl(dimethyl) amine propionate], or as Incrosoft® T-75 [Ditallowdiamido methosulfate (quaternium 53)].

Examples of preferred imidazolinium quarternaries include, but are not limited to, (methyl-1-tallow-amido) ethyl-2-tallow imidazolinmum methyl sulfate, available commercially from Sherex Chemical Co. as Varisoft® 475; (methyl-1-oleylamido)ethyl-2-oleyl-imidazolinium methyl sulfate, available commercially from Sherex Chemical Co. as Varisoft® 3690; tallow imidazolinium methosulfate (Incrosoft® S-75), and alkylimidazolinium methosulfate (Incrosoft® CFI-75), both available from Croda, Inc., New York, N.Y.

Other useful amine salts are the stearyl amine salts that are soluble in water such as stearyl-dimethylamine hydrochloride, distearyl amine hydrochloride, decyl pyridinium bromide, the pyridinium chloride derivative of the acetylaminoethyl esters of lauric acid, lauryl trimethyl ammonium chloride, decylamine acetate and bis-[(oleoyl)-(5,8)-ethanoloxy]-tallow($C_{14}$–$C_{18}$)aminehydrogen phosphate (Necon(® CPS-100) and the like.

Water

Depending upon the nature of the other components present in the dry-cleaning composition and their respective amounts, when water is present, the water content of the composition can range from about 40–95 weight percent, preferably from about 60–90 weight percent and most preferably from about 75–87.5 weight percent. Generally, sufficient water is employed to completely disperse the gelling agent and other components to insure the preparation of a gelled, homogeneous dry-cleaning composition upon cooling, and also to aid in the removal of water-based stains.

Inorganic Salt

Under some circumstances, such as when carrageenans are employed as the gelling agent(s), application of the dry-cleaning composition to the fabric to be cleaned can deposit a white residue on the fabric. Therefore, particularly when colored fabrics are to be treated, it is preferred to incorporate a minor but effective amount of a metal salt, such as a metal halide, into the gelled liquid cleaning composition. Alkali metal or alkaline earth metal salts are preferred for this purpose, most preferably potassium, sodium, lithium or calcium chloride is used. The salt is effective at very low levels, e.g. at about 0.0025–0.1% by weight of the gelled liquid cleaning composition.

Optionally, a fragrance, deodorant, preservative, insect repellant (moth-proofing agent), and/or coloring agent may be present in the gelled dry-cleaning composition, along with any of a number of finishing agents, fumigants, lubricants, fungicides and sizing agents, as long as such additives do not interfere with the dispersal and spot and/or stain removal properties of the composition. The amounts of these additives will generally comprise from about 0.25% to about 5% by weight of the total dry-cleaning composition. Organic fragrances, such as oil of cedar, which can also perform an insect repellant function, are preferred.

After use, the bag may be discarded, or if desired, it may be constructed of a suitable material to provide it with repeated usage in a plurality of cleaning cycles.

The following examples further illustrate the present invention and preferred embodiments thereof. It is to be understood, however, that these examples are for illustrative purposes only and are not intended to limit the scope of the specification or claims thereof in any way.

EXAMPLE I

Formulation of Dry-cleaning Composition

A 250 ml beaker was charged with 84.72 ml distilled water. The beaker was heated to 80° C., at which point 9.75 ml of Carbitol Sol.® (A glycol ether, Union Carbide Corp.) was added, followed, sequentially at five minute intervals, by the addition of 1.87 g "Active #2" (a nonionic surfactant, Blew Chemical Co.), 0.63 g of Tergitol 15-S-3 ($(C_{11-15}H_{23-31})O(CH_2CH_2O)_3H$, Union Carbide Chemicals, Danbury, Conn.), 2.0 g Schercamox DML (Lauramine Oxide, Scher Chemicals, Inc., Clifton, N.J.), 0.53 g of preservative (Nuosept 95, Nuodea, Inc., Piscataway, N.J.) and 0.5 g of fragrance.

After 5 min, 50 g of the mixture was sprayed onto the inner surface of a 26"×30" bag, having adhered thereto a 18"×18" non-woven sheet (Crown Textile Co.). About 50% of the mixture adhered. Upon cooling, a finished dry-cleaning bag was obtained, the interior surface of which was impregnated and stably coated with a gelled dry-cleaning composition. The dry-cleaning bag was folded and packaged in a plastic-lined foiled packet.

EXAMPLE II

Dry-Cleaning Bag

A dry cleaning bag was prepared as disclosed in Example I but using Arcosolv DMI (a glycol ether, Arco Chemical) in place of the Carbitol solvent To evaluate the ability of the resultant bag to clean soiled fabrics, two inch diameter stains were made on swatches of various materials with beef gravy, spaghetti sauce, lipstick and foundation. The stains were allowed to age at 25° C. for 24 hr. The stained fabrics were evaluated visually, and one swatch of each stain was retained as a control (visual stain rating=10).

The swatches were individually rubbed or dabbed on the inside surface to loosen and remove the soil and placed into bags which had previously had the dry cleaning composition absorbed into their inner surfaces. The bag was sealed and the bag and its contents were tumbled in a hot air dryer for 20 minutes on low heat.

The swatches were removed from the bags and visually evaluated after 24 hours.

The invention has been described with reference to various specific and preferred embodiments and techniques. However, it should be understood that many variations and modifications may be made while remaining within the spirit and scope of the invention.

What is claimed is:

1. A bag adapted for containment and cleaning of a soiled fabric article, said bag comprising:

a fastening system for closing an opening in said bag so that said bag can enclose a soiled fabric article, and at least a portion of an interior surface of said bag having dry-cleaning or freshening composition releasably absorbed thereto, wherein said bag is formed of a thermally stable material which is not substantially damaged upon exposure to agitation or heat inside a rotary hot air dryer.

2. The bag of claim 1, wherein said bag is flexible.

3. The bag of claim 1, wherein said bag is formed of one or more layers of plastic film, and wherein the interior surface is formed of a film that is absorptive.

4. The bag of claim 3, wherein the film forming the interior surface is a member selected from the group consisting of a reticulated plastic foam, a solid granular or porous absorbent solid filled plastic film and a combination of both foamed and solids loaded plastic.

5. The bag of claim 1, wherein said dry-cleaning composition cleans said fabric article and said interior surface of said bag absorbs moisture and removed soil from the fabric article.

6. The bag of claim 1, wherein the dry-cleaning or freshening composition is absorbed directly to the interior surface of said bag.

7. The bag of claim 1, wherein said dry-cleaning or freshening composition comprises an organic gelling agent, water, at least one organic solvent, and at least one surfactant.

8. The bag of claim 7, wherein said dry-cleaning or freshening composition further comprises an alkali metal salt.

9. The bag of claim 8, wherein the alkali metal salt is present in the dry-cleaning or freshening composition in an amount from about 0.0025 to about 0.075 weight percent.

10. The bag of claim 7, wherein said dry-cleaning or freshening composition further comprises one or more members selected from the group consisting of a fragrance, a preservative, a deodorant, an insect repellant, a coloring agent, a finishing agent, a fumigant, a lubricant, a fungicide, and a sizing agent.

11. The bag of claim 7, wherein the organic solvent is selected from the group consisting of lower(alkoxy) or lower(alkoxy)lower(alkoxy)-ethers of ethanol or isopropanol, and mixtures thereof.

12. The bag of claim 7, wherein the organic solvent comprises at least one glycol ether.

13. The bag of claim 7, wherein the organic solvent is selected from the group consisting of N-methyl-2-pyrrolidinone, 2-pyrrolidinone, and mixtures thereof.

14. The bag of claim 7, wherein the organic solvent is selected from the group consisting of polyethylene glycols, ethanol, isopropanol, n-butanol, acetone, methyl ethyl ketone, $C_{2-4}$ polyols, hydrocarbon solvents, and mixtures thereof.

15. The bag of claim 14, wherein the polyethylene glycol is polyethylene glycol-200, 300, 400 or 600, wherein the suffixed numbers indicate the approximate molecular weight of the glycol.

16. The bag of claim 14, wherein the $C_{2-4}$ polyols are selected from the group consisting of diols and triols.

17. The bag of claim 14, wherein the hydrocarbon solvent is isoparaffinic solvent.

18. The bag of claim 7, wherein the organic solvent is selected from the group consisting of carbon tetrachloride, methylene chloride, 1,1-dichloroethane, 1,2-dichloroethane, 1,1-trichloroethane, 1,1,2-trichloroethane, 1,1,1-trichloroethane, 1,1,2-trichloroethane, trichloroethylene, 1,1,2,2-tetrachloroethane, tetrachloroethylene, pentachloroethane, monochlorocyclohexane, 1,4-dichlorocyclohexane, monochlorobenzene, and mixtures thereof.

19. The bag of claim 7, wherein the organic solvent is present in the dry-cleaning or freshening composition in an amount from about 2 to about 32 weight percent.

20. The bag of claim 7, wherein the surfactant is a nonionic or amphoteric surfactant, or mixtures thereof.

21. The bag of claim 7, wherein the surfactant is present in the dry-cleaning or freshening composition in an amount from about 1 to about 10 weight percent.

22. The bag of claim 7, wherein the organic gelling agent is selected from the group consisting of alkali metal salts of alginic acid, carrageenan, pectin, guar gum, polyvinylpyrrolidone, polyvinyl alcohol, polyacrylamides and polymeric organic waxes, fatty acids, and mixtures thereof.

23. The bag of claim 7, wherein the organic gelling agent is present in the dry-cleaning or freshening composition in an amount from about 0.25 to about 8 weight percent.

24. The bag of claim 7, wherein the water is present in the dry-cleaning or freshening composition in an amount from about 40 to about 95 weight percent.

25. The bag of claim 7, wherein the organic gelling agent is a polysaccharide gum.

26. The bag of claim 1, wherein said bag has dimensions of about 18"×23" up to about 36"×40".

27. The bag of claim 1, wherein a surface area of said interior surface of said bag having said dry-cleaning or freshening composition absorbed thereto is about 560 square inches to about 1020 square inches.

28. The bag of claim 1, wherein said bag is formed of a polyethylene, polypropylene, polyamide, or mixtures thereof.

29. The bag of claim 1, wherein said interior of said bag is suitable for dabbing said dry-cleaning or freshening composition onto said fabric article.

30. The bag of claim 1, wherein said bag is reusable.

31. The bag of claim 1, wherein said bag is disposable.

32. The bag of claim 1, wherein said fastening system consists of press studs, clips, a zipper, a VELCRO strip, a ZIP-LOCK, or opposed strips of resealable adhesive.

33. The bag of claim 1, wherein the dry-cleaning or freshening composition is releasably absorbed on an interior surface of the bag which comprises an adhered absorbent fibrous or foam sheet.

34. The bag of claim 1, wherein the at least a portion of the interior surface of the bag is formed of a non-woven fibrous material.

35. The bag of claim 34, wherein the non-woven fibrous material has a web structure, a corded fiber structure or comprises a fibrous mat in which the fibers are distributed haphazardly or in a random array.

36. The bag of claim 34, wherein the non-woven fibrous material is selected from the group consisting of wool, silk, jute, hemp, cotton, linen, sisal, ramie, rayon, cellulose ester, polyvinyl derivatives, polyolefins, polyamides and polyesters.

37. A packaged dry-cleaning or fabric freshening bag, comprising a bag adapted for containment and cleaning or freshening of a soiled fabric article, said bag comprising:

an opening and a fastening system so that said bag can enclose a soiled fabric article, and at least a portion of an interior surface of said bag having dry-cleaning or freshening composition releasably absorbed thereto, wherein said bag is formed of a thermally stable material which is not substantially damaged upon exposure to agitation or heat inside a rotary hot air dryer, and a moisture impermeable package, wherein said bag is packaged in said moisture impermeable package after manufacture of said bag and prior to said use thereof in dry-cleaning or fabric freshening.

38. The packaged dry-cleaning bag of claim 37, wherein said package is made out of foil, a foil-plastic film, or a foil-treated paper composite envelope.

39. The packaged dry-cleaning bag of claim 37, wherein the dry-cleaning or freshening composition comprises an organic gelling agent, water, at least one organic solvent and at least one surfactant.

40. The packaged dry-cleaning bag of claim 39, wherein the organic solvent is selected from the group consisting of lower(alkoxy) or lower(alkoxy)lower(alkoxy)-ethers of ethanol or isopropanol, and mixtures thereof.

41. The packaged dry-cleaning bag of claim 39, wherein the organic solvent comprises at least one glycol ether.

42. The packaged dry-cleaning bag of claim 39, wherein the organic solvent is selected from the group consisting of N-methyl-2-pyrrolidinone, 2-pyrrolidinone, and mixtures thereof.

43. The packaged dry-cleaning bag of claim 39, wherein the organic solvent is selected from the group consisting of polyethylene glycols, ethanol, isopropanol, n-butanol, acetone, methyl ethyl ketone, $C_{2-4}$ polyols, hydrocarbon solvents, and mixtures thereof.

44. The packaged dry-cleaning bag of claim 43, wherein the polyethylene glycol is polyethylene glycol-200, 300, 400 or 600, wherein the suffixed numbers indicate the approximate molecular weight of the glycol.

45. The packaged dry-cleaning bag of claim 43, wherein the $C_{2-4}$ polyols are selected from the group consisting of diols and triols.

46. The packaged dry-cleaning bag of claim 43, wherein the hydrocarbon solvent is isoparaffinic solvent.

47. The packaged dry-cleaning bag of claim 39, wherein the organic solvent is selected from the group consisting of carbon tetrachloride, methylene chloride, 1,1-dichloroethane, 1,2-dichloroethane, 1,1-trichloroethane, 1,1,2-trichloroethane, 1,1,1-trichloroethane, 1,1,2-trichloroethane, trichloroethylene, 1,1,2,2-tetrachloroethane, tetrachloroethylene, pentachloroethane, monochlorocyclohexane, 1,4-dichlorocyclohexane, monochlorobenzene, and mixtures thereof.

48. The packaged dry-cleaning bag of claim 39, wherein the organic solvent is present in the dry-cleaning or freshening composition in an amount from about 2 to about 32 weight percent.

49. The packaged dry-cleaning bag of claim 39, wherein the surfactant is a nonionic or amphoteric surfactant, or mixtures thereof.

50. The packaged dry-cleaning bag of claim 39, wherein the surfactant is present in the dry-cleaning or freshening composition in an amount from about 1 to about 10 weight percent.

51. The packaged dry-cleaning bag of claim 39, wherein the organic gelling agent is selected from the group consisting of alkali metal salts of alginic aid, carrageenan, pectin, guar gum, polyvinylpyrrolidone, polyvinyl alcohol, polyacrylamides and polymeric organic waxes, fatty acids, and mixtures thereof.

52. The packaged dry-cleaning bag of claim 39, wherein the organic gelling agent is present in the dry-cleaning or freshening composition in an amount from about 0.25 to about 8 weight percent.

53. The packaged dry-cleaning bag of claim 39, wherein the water is present in the dry-cleaning or freshening composition in an amount from about 40 to about 95 weight percent.

54. The packaged dry-cleaning bag of claim 39, wherein the dry-cleaning or freshening composition further comprises an alkali metal salt.

55. The packaged dry-cleaning bag of claim 54, wherein the alkali metal salt is present in the dry-cleaning or freshening composition in an amount from about 0.0025 to about 0.075 weight percent.

56. The packaged dry-cleaning bag of claim 39, wherein the organic gelling agent is a polysaccharide gum.

57. The packaged dry-cleaning bag of claim 39, wherein said fastening system consists of press studs, clips, a zipper, a VELCRO strip, a ZIP-LOCK, or opposed strips of resealable adhesive.

58. The packaged dry-cleaning bag of claim 37, wherein the dry-cleaning or freshening composition is releasably absorbed on an interior surface of the bag which comprises an adhered absorbent fibrous or foam sheet.

59. A method for making a dry-cleaning or fabric-freshening product comprising:

1) forming a bag having
   a first outermost layer in the shape of a bag, said bag having an opening and a closing system; said first outermost layer comprising a flexible thermally stable material that is essentially gas impermeable and is suitable for withstanding temperatures inside a hot rotary dryer, and
   a second absorbent layer on at least a portion of an interior surface of said bag,
2) applying a dry-cleaning or freshening composition directly to said second absorbent layer; and
3) packaging said bag to prevent moisture loss from said dry-cleaning or freshening composition.

60. The method of claim 59, wherein said first outermost layer comprises polyethylene, polypropylene, polyamide or mixtures thereof.

61. The method of claim 59, wherein said second absorbent layer is a member selected from the group consisting of wool, silk, jute, hemp, cotton, linen, sisal, ramie, rayon, cellulose ester, polyvinyl polyolefins, polyamides and polyesters.

62. The method of claim 59, wherein said second absorbent layer is a reticulated plastic film formed in situ.

63. The method of claim 59, wherein said second absorbent layer is a solid granular or porous absorbent solid filled plastic film.

64. The method of claim 59, wherein said second absorbent layer is a foamed and solids loaded plastic.

65. The method of claim 59, wherein said bag is formed by coextrusion of said first outermost layer and said second absorbent layer.

66. The method of claim 59, wherein said bag is formed by first forming said first outermost layer into said bag and then attaching said second absorbent layer to an inside surface of the bag.

67. A process for cleaning or freshening a soiled fabric article with a cleaning or freshening composition, said process comprising:

(a) placing said soiled fabric article into a bag having an opening, said bag comprising (i) an essentially gas impermeable film, (ii) a fastening system so that the bag can enclose said soiled fabric and (iii) at least a portion of an interior surface having an effective amount of a cleaning or freshening composition releasably absorbed thereinto;

(b) closing said fastening system to enclose said soiled fabric article;

(c) tumbling said closed bag in a rotary clothes dryer at an elevated temperature, so that the cleaning or freshening composition is released from said interior surface and contacts said soiled article so as to effectively disperse said soil; and (d) opening said fastening system and removing the cleaned or freshened fabric article from the bag.

68. The process of claim 67 wherein, prior to step (a), an amount of the cleaning or freshening composition is applied to the soiled fabric article to loosen said soil.

69. The process of claim 68, wherein the amount of cleaning or freshening composition prior to step (a) is applied by rubbing or dabbing the soiled fabric article on said interior surface of the bag to loosen and remove soil from the soiled fabric article.

70. The process of claim 68, wherein the amount of cleaning or freshening composition prior to step (a) is applied either by spraying or dipping the article with the cleaning or freshening composition.

71. The process of claim 67, wherein the interior surface absorbs moisture and soil from the fabric article.

72. A method for removing a stain from a soiled fabric article with a cleaning or freshening composition, said process comprising:

(a) placing said soiled fabric article into a bag having an opening, said bag comprising (i) an essentially gas impermeable film, (ii) a fastening system so that the bag can enclose said soiled fabric and (iii) at least a portion of an interior surface having an effective amount of a cleaning or freshening composition releasably absorbed thereinto;

(b) closing said fastening system; and (c) tumbling said sealed bag for a sufficient time and at a sufficient temperature in a rotary clothes dryer to release the cleaning or freshening composition from the interior surface and to contact an effective amount of the released cleaning or freshening composition with the soiled fabric article so as to effectively remove the stain.

73. The method of claim 72 wherein, prior to step (a), an amount of the cleaning or freshening composition is applied to the soiled fabric article to loosen the stain.

74. The method of claim 72 wherein the amount of cleaning or freshening composition prior to step (a) is applied by rubbing or dabbing the soiled fabric article on said inside surface of the bag to loosen and remove stain.

75. The method of claim 73 wherein the amount of cleaning or freshening composition prior to step (a) is applied by spraying or dipping the article with the composition.

76. A fabric-cleaning kit comprising, packaged in association:

(a) at least one bag having an opening, wherein the bag comprises (i) a fastening system so that the bag can enclose a soiled fabric article and (ii) an interior surface having an effective amount of a cleaning or freshening composition releasably absorbed thereinto, and (b) a fabric-cleaning or fabric-freshening composition consisting essentially of water; an organic solvent; at least one surfactant; and a gelling agent.

77. The fabric-cleaning kit of claim 76, wherein the fabric-cleaning or fabric-freshening composition in (b) is in the form of a spray, a dipping solution or a sponge impregnated therewith.

78. A method for forming a fabric-treatment bag comprising the steps of:

(a) simultaneously extruding one or more layers of plastic film and blowing the film into the shape of a bag; and (b) impregnating the interior surface of the bag with a fabric-cleaning composition.

79. The method of claim 78, wherein said one or more layers include (a) an exterior layer of a vapor impermeable plastic film and (b) an interior layer of an absorptive plastic film.

80. The method of claim 78, wherein the plastic film is selected from the group consisting of a polyethylene, polypropylene, polyamide, or mixtures thereof.

81. The method of claim 78, wherein the interior surface of the bag is formed of a plastic film selected from the group consisting of a reticulated plastic foam, a solid granular plastic film, a porous absorbent solid filled plastic film, and mixtures thereof.

* * * * *